United States Patent
Whitacre et al.

[15] 3,662,661
[45] May 16, 1972

[54] SCIENTIFIC EXPERIMENT FLEXIBLE MOUNT

[72] Inventors: Horace E. Whitacre, Pasadena; Arthur R. White, Houston, both of Tex.

[73] Assignee: The United States of America as represented by the Administrator of the National Aeronautics and Space Administration

[22] Filed: Aug. 17, 1970

[21] Appl. No.: 64,391

[52] U.S. Cl. ............................................................95/12.5
[51] Int. Cl. ......................................................G03b 29/00
[58] Field of Search ................95/12.5, 86; 33/163; 248/182, 248/183, 184, 278

[56] References Cited

UNITED STATES PATENTS

| | | |
|---|---|---|
| 2,198,920 | 4/1940 | Robinson...............................95/12.5 |
| 1,605,725 | 11/1926 | Herbert.....................................351/7 |
| 3,402,613 | 9/1968 | Neusel et al. ..........................33/163 X |
| 3,421,721 | 1/1969 | Miller...................................95/12.5 X |
| 2,701,113 | 2/1955 | Koonter....................................248/44 |
| 3,086,107 | 4/1963 | Grover.....................................240/52 |

*Primary Examiner*—John M. Horan
*Attorney*—Russell E. Schlorff, Marvin F. Matthews and John R. Manning

[57] ABSTRACT

An apparatus for mounting scientific experiments in a spacecraft which permits their utilization without maneuvering of the spacecraft. One end of an elongated flexible bellows is hermetically attached to the framework of the spacecraft in an encircling relationship about an opening. The other end is sealed over with an adapter plate to permit interconnection of a camera, optical system, sextant, or other equipment. A gimbal system attaches the adaptor plate to the frame of the spacecraft permitting rotational movement on a pair of orthogonal axes. Drive motors or hand operated adjusting means interconnect the pair of gimbals for controlled movement of the scientific experiment.

10 Claims, 6 Drawing Figures

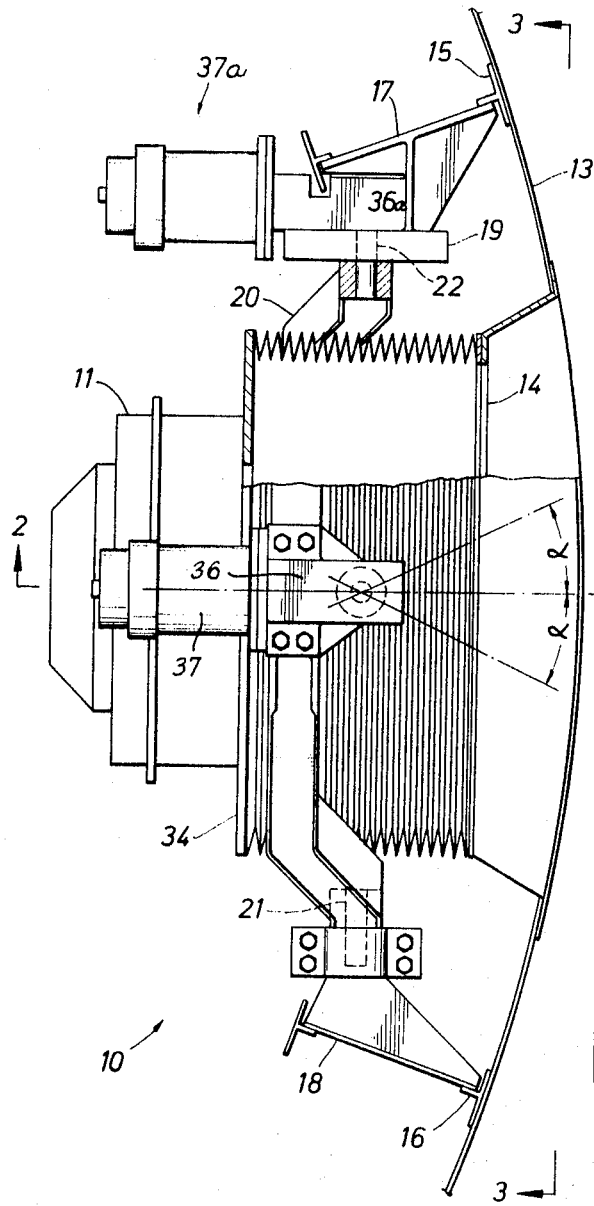
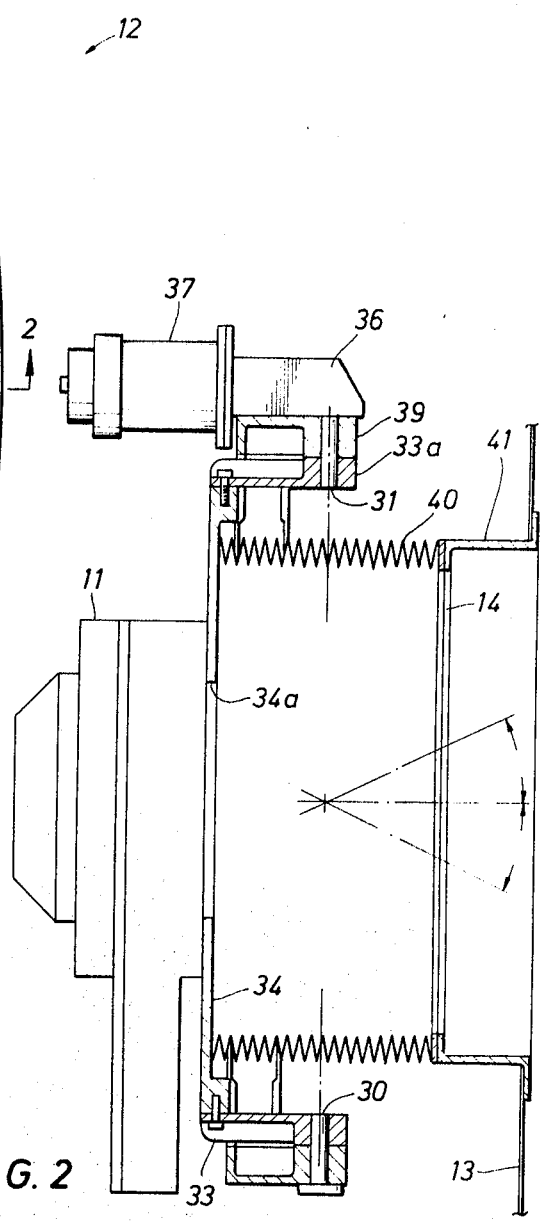
FIG. 1
FIG. 2
Horace E. Whitacre
Arthur R. White
INVENTORS
BY
Russell E. Schloff
ATTORNEY Horace E. Whitacre
Arthur R. White
INVENTORS Horace E. Whitacre
Arthur R. White
INVENTORS

BY

Russell E. Schloff
ATTORNEY

SCIENTIFIC EXPERIMENT FLEXIBLE MOUNT

ORIGIN OF THE INVENTION

The invention described herein was made by employees of the United States Government and may be manufactured and used by or for the Government for governmental purposes without the payment of any royalties thereon or therefor.

SUMMARY OF PROBLEM AND INVENTION

In aircraft and spacecraft, a problem exists in the positioning of cameras and similar equipment which must view some outside point. Quite often, it is adequate to merely hand hold a camera or other device for the purpose of obtaining pictures. However, in many cases this is not adequate because of the accuracy and steadiness required in pointing the camera.

In many cases, the accuracy required in pointing far exceeds that which can be provided by hand-held equipment. In many cases, the desired angle may be defined in degrees and minutes. It is beyond conjecture that hand-held equipment can achieve such accuracy.

Pursuing the problem further, it is well nigh impossible to obtain repeatability in positioning a camera or related device adjacent to a port hole. However, the apparatus of the present invention lends itself to repeated positioning inasmuch as the angles defining its original position are indicated by the adjustments for the positioning system. These adjustments can be duplicated later on.

The apparatus of the present invention is summarized as including a flexible but precision mounting system for securing a camera, sextant, or other scientific equipment at a precise location with respect to an opening through the skin of a spacecraft. More particularly, it is useful with a craft which normally incorporates a port which is surrounded by the skin and suitable framing members, and wherein a differential pressure exists between the interior and exterior of said craft. It incorporates an extendable and flexible set of bellows which have an internal diameter approximately equal to that of the port itself. The outboard end of the bellows is anchored and sealed with respect to the port to maintain an air-tight structure between the interior and exterior of the craft. The bellows are open down the center to provide a path for the optical or other equipment which utilizes the present invention. The rear of the bellows connects to an adaptor plate which is a suitable mounting point for the camera or other equipment. The adaptor plate and mounted equipment seals over the rear of the bellows to preserve the air-tight relationship previously mentioned. The rear adaptor plate is secured to the frame of the craft by means which permit the equipment and adaptor plate to be positioned at a precise relationship with respect to the port. This means incorporates, in the preferred embodiment, a pair of gimbals which are positioned for relative rotation about a pair of perpendicular axes. The gimbal movement permits rotation and locking at a predetermined position. Moreover, repeatability is achieved inasmuch as the gimbals are preferably equipped with calibrated hand adjustable control knobs. The control knobs themselves are preferably equipped with coarse and fine adjustments. With such device it is possible to precisely aim the experiment without maneuvering the spacecraft itself which would be required if the scientific experiment mount were rigid.

Many objects and advantages of the present invention will become more readily apparent from a consideration of the following specification and included drawings, wherein:

FIG. 1 is a side view of the present invention, partly in section, illustrating the relationship of the invention to the port of a spacecraft;

FIG. 2 is a sectional view taken along the line 2 — 2 of FIG. 1;

Figure 3:
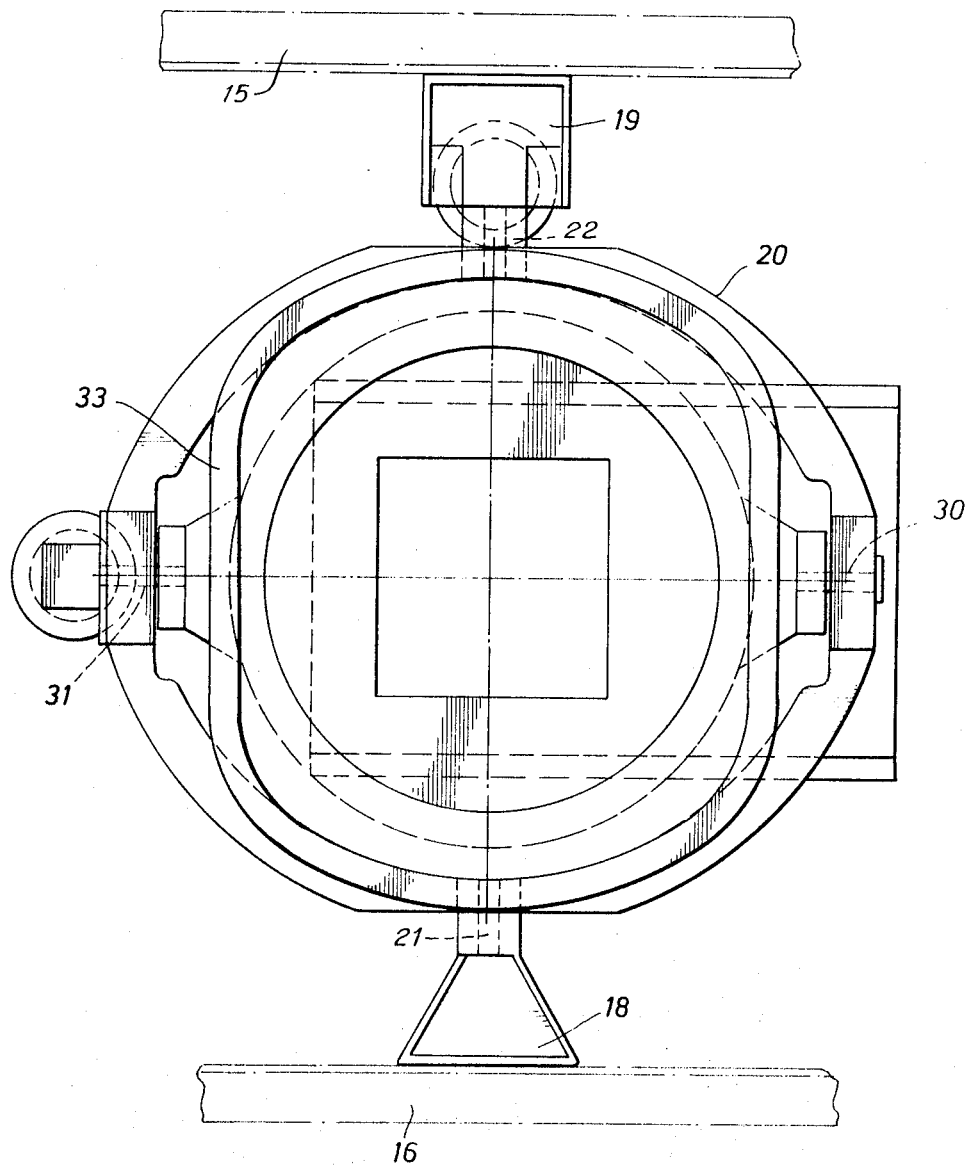
FIG. 3 is a sectional view taken along the line 3 — 3 of FIG. 1 with the exterior wall of the spacecraft removed therefrom.

In the drawings, attention is first directed to FIG. 1 where the scientific experiment flexible mount is indicated by the numeral 10, and a scientific device by the numeral 11. The flexible mount is attached to a spacecraft 12, having an exterior formed of a skin 13 and a port 14 with or without a conventional transparent material. Broadly, the flexible mounting device is joined to the craft 12 between a pair of intercostals 15 and 16 which support the weight of flexible mount 10. The scientific device 11 may vary widely, but is, in many cases, a camera-like device which is pointed or aimed at an appropriate subject and which therefore must have a clear field of vision through the center of the flexible mount 10. The cooperation of the flexible mount 10 with the scientific device will be described in detail hereinafter.

Considering some of the details, it is appropriate to first describe the craft itself, which may be a conventional aircraft or a spacecraft such as the present Apollo vehicles, the space station, the space shuttle, or the like. The craft provides a stable platform and appropriate environment for the utilization of the scientific device 11. Quite often, the scientific device 11 must be pointed through the port 14 with some degree of accuracy and steadiness, and in some experiments, with great repeatability, as it is pointed several times to the same object of interest. For this reason, the flexible mount 10 is fixedly secured to the intercostals 15 and 16 which define the structural framework of the craft itself. This thereby permits the flexible mount to be securely anchored with respect to the craft. As shown in FIG. 1, a support bracket 17 which is symmetrically similar to a bracket 18 shown in the lower portions of FIG. 1 carries a mounting block 19 which supports a rotatable or pivotal connection with a support bracket 20. As will be described hereinafter, the support bracket 20 carries the weight of the flexible mount.

At the lower end of FIG. 1, a pivotal mounting pin indicated by the numeral 21 is shown in dotted line. The pin 21 is supported by the bracket 18. The pin 21 is likewise connected with the bracket 20 which is a generally circular structure as best shown in FIG. 3 of the drawings. The bracket 20 fully encircles the flexible mount 10 and rotates about the pin 21 and a similar pin 22 in the bracket 19. The pins 21 and 22 share a common axis. The pins define an axis of rotation for the bracket 20 which is tilted through a range of angles as will be more definitely defined hereinafter.

To this juncture, it will be noted that the brackets 17 and 18 are rigidly fixed in space while the pins 21 and 22 which are supported by them define a pivotal axis. Further, the encircling support or gimbal ring 20 which is more properly a gimbal ring extends about the bellows.

To this juncture, the first encircling support ring 20 has been identified and described as being mounted on an axis permitting its pivotal movement, the axis being defined by the pins 21 and 22 best shown in FIG. 1. Attention is next directed to FIG. 3 where additional apparatus carried by the encircling support member 20 which is in actuality a gimbal ring, is incorporated permitting movement about an axis perpendicular to that defined for the first gimbal ring 20. In FIG. 3, the encircling gimbal ring 20 supports an additional pair of pivot pins at 30 and 31. The pins 30 and 31 define a second axis of rotation which is perpendicular to the first axis. The pins 30 and 31 are on a common axis which is preferably found at a 90° angle with respect to the axis defined by the pivot pins 21 and 22. Additionally, the pins 30 and 31 are carried by the gimbal ring 20. Thus, the pins 30 and 31 define an axis of rotation which is dependent on the position of the first axis, the axis defined by the pins 21 and 22. As shown in FIG. 3, the pins 30 and 31 extend inwardly and support a second gimbal ring 33. The gimbal ring 33 is a generally encircling ring which extends about the flexible bellows which will be described hereinafter. The ring 33 is relatively deep as best shown in FIG. 2, and is bolted to the periphery of a mounting plate 34 shown in FIG. 2. It will be observed that the plate 34 fairly well closes over the area within the ring 33 except for a central opening which permits the scientific device 11 to function along an axial path through the bellows apparatus as will be described. The mounting plate 34 is carried in a planar relationship to the ring 33 for the purpose of moving with the ring.

Considering FIG. 2 in greater detail, it will be observed that the second axis is defined by the pins 30 and 31. The pin 30 is merely passive. The pin 31 provides a source of rotation as will be described. The pin 31 is preferably connected into a gear housing 36 to which is connected a bi-directional, hand-rotated driving means 37. More will be noted concerning the driving means 37 hereinafter. Additionally, FIG. 2 shows the connection of the mounting plate 34 to a set of extendable and flexible metal bellows indicated by the numeral 40. The bellows extend to the port or opening 14 in the side of the craft. Additionally, the bellows are fully sealed at their connection around the opening or port 14. The bellows are likewise sealed to the plate 34. Both seals can be effected by brazing or welding for metal bellows. The bellows are joined around the periphery to thereby define a pair of leak-proof seals, the connections being preventive of leakage through the flexible mount of the present invention from the interior to the exterior of the craft. As will be understood, quite often the craft will be used in an environment where the outside pressure is quite low. To prevent loss of inside pressure, a vacuum tight seal is highly desirable.

The mounting plate 34 has a central opening 34a to permit the scientific device 11, of whatever definition, to have an optical axis whereby an external view is achieved.

In FIG. 2, it will be further noted that the craft is so constructed and arranged to have a shroud 41 which surrounds the port 14 and extends to the outer skin 13. The shroud 41 serves as somewhat of an extension of the bellows, although it will be appreciated that the shroud is inflexible and constitutes an adapter from the bellows to the craft itself. The shroud is sealingly connected with the outer skin 13 and with the bellows 40 to prevent leakage from the interior of the craft.

It will be noted that in the relaxed position, the position in which the gimbals are at a 90° angle with respect to one another, the plate 34 and the port 14 are essentially parallel. The equipment is able to flex and deflect upwardly or downwardly and to either side. The flexures are accommodated in the flexible bellows 40. The flexures are achieved by moving the various gimbals to different angles. The gimbals are held at these angles in a manner to be described hereinafter.

Figure 4:
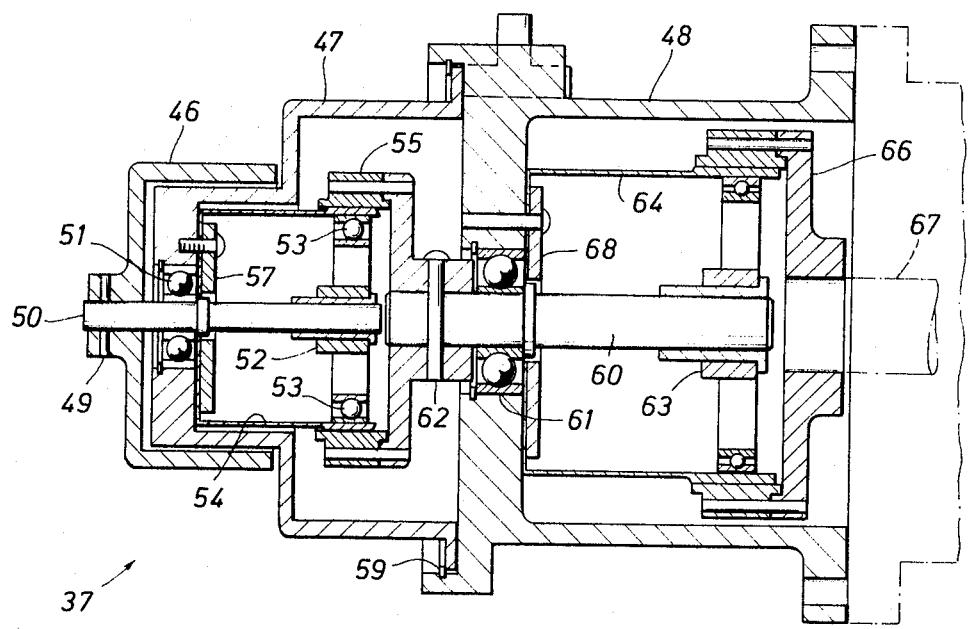
FIG. 4 is an enlarged sectional view of a hand rotatable, bi-directional adjustment means which positions the gimbals of the preferred embodiment at a predetermined angle.

For an understanding of the operation of the gimbal mount system shown in the preferred embodiment, attention is next directed to FIG. 4, which illustrates the means 37 in greater detail. The driving means 37 is a bi-directional, hand-adjustable drive which changes the angle of the gimbals from the neutral or perfectly perpendicular position shown in FIG. 3. In FIG. 4, the numeral 46 indicates a small hub which is immediately adjacent a larger hub 47. The hubs 46 and 47 provide a fine and a rather coarse drive for the equipment. The ratio between the two may be 50-to-1. That is to say, 50 turns of the hub 46 will provide one turn of the hub 47. The hub 47 preferably provides about 100 turns to achieve one complete revolution of the gimbal which is connected to it, it being kept in mind that the gimbals are not permitted to rotate fully about a 360° arc, but are limited in their range of movement. These ratios are suggested for relatively easy hand operation, and of course, may be varied in a known circumstance of installation and other design factors.

In any case, the driving means 37 provides movement in accordance with the needs described. The numeral 48 indicates a fixed housing which supports structure found in the driving means 37. The device 37 is known as a harmonic drive. It functions in the following manner. The fine tuning hub 46 is joined by means of a pin 49 to a shaft 50. The shaft 50 is supported in a ball bearing assembly 51 which is locked in place by means of a lock ring to the rotatable housing or hub 47. A collar supports an elliptical cam 52 which has two outer points which are in the form of roller bearings as shown at 53. The cam is of smaller radius at other points, and hence, does not extend outwardly as far as the roller bearing 53. The numeral 54 indicates a splined cup of flexible material. It has teeth which extend outwardly at its rear end and which engage teeth on the inside of a gear 55. The internally toothed gear 55 has about two more teeth than the number of teeth found on the spline 54. The spline 54 is made of flexible material with teeth which match only at points of contact which are forced into mesh by the cam 52. That is to say, the teeth mesh only adjacent the roller bearings 53 which force the teeth into meshing contact with the gear 55. At all other points about the periphery of the spline 54, the teeth are disengaged. 33a It will be understood that one full revolution of the shaft 50 carries the cam 52 through a full revolution. However, the flex cup 54 does not rotate one full revolution. Rather, it steps a portion of a revolution determined by the ratio of the number of teeth in the internally toothed gear 55 and the difference of teeth in the internally toothed gear 55 and the spline.

The forward end of the flexible spline 54 is joined by means of a lock collar 57 to the hub 47. The hub 47 provides the coarse tuning while the hub 46 provides the fine tuning. The hub 47 supports the spline cup 54 and rotates with it in view of the mechanical connection between the members. The hub 47 is supported at its rear position by means of a lock ring 59 received within a recessed opening in the fixed housing 48.

While the foregoing sets forth the manner in which the vernier knob 46 is connected mechanically, one should next consider the connection of the coarse knob 47 to the apparatus. The harmonic drive further includes a connection of the internally toothed gear 55 to a shaft 60. The shaft 60 is supported by a bearing assembly 61 journaled within a webbing of the fixed housing 48. The gear 55 is joined by means of a pin 62 to the shaft 60. The shaft 60 is joined to an additional elliptical cam at 63 which is similar to the cam 52 previously mentioned. The cam 63 is elliptical and has a pair of roller bearings which contact the inner periphery of an additional flexible cup-shaped spline 64. The spline 64 is equipped with teeth at its outer and rearward periphery. These teeth mesh with the teeth on an internally toothed gear 66. The gear 66 is connected to a shaft 67. The flexible cup 64 is pinned and fixed in position by means of a collar 68 which surrounds the shaft 60 and which is bolted to the casting comprising the fixed housing 48. Thus, the splined flexible cup 64 does not move by rotation.

When the shaft 60 is rotated, the cam 63 forms two points of contact which force the teeth on the outer periphery of the flexible cup 64 into engagement with the teeth from the gear 66. Again, the gear 66 is internally toothed. The rotation of the elliptical cam 63 forces the teeth on the flexible cup-like spline 64 into and out of engagement with the gear 66. Relative rotation is achieved which results in rotation of the gear 66 and its mounting shaft 67.

The foregoing sets forth operation of the driving means 37 which is previously illustrated broadly in FIG. 1 and FIG. 2. Returning again to FIGS. 1 and 2, it will be noted that a driving means is included at two locations. Considering only FIG. 2 for the moment, the driving means 37 is connected with a miter gear box 36. The gear box 36 receives the shaft 67 best shown in FIG. 4, and through the use of a pair of bevel gears, causes rotation of the shaft or pin 31 which defines pivotal connection. The pin is pivotally mounted with respect to the gimbal ring 33, but is fixedly connected inside the housing 39 which is best shown in FIG. 2. That is to say, the driving means 37, gear box 36, and mounting block 39 all cooperate to rotate the pin 31. The pin 31 is rigidly connected to a casting 33a which comprises a portion of the gimbal ring 33. As viewed in FIG. 2, the casting 39 and gear box 36 may be presumed to be fixed structures. The pin 31 is rotated and carries with it the casting 33a which thereby rotates the gimbal ring 33 and the mounting plate 34 previously described. Referring now to FIG. 1, the driving means 37a for the other dimension of movement will be considered. As shown in FIG. 1, the intercostal 15 provides support for a fixed mounting bracket 17 which is connected with a mounting block 19. The driving means 37a utilizes a similar gear box 36a which is rigidly fixed with respect to the craft. The pin 22 is rotated as it passes through the mounting block 19, but is rigidly fixed to the support member 20 which is the outer or first gimbal ring of the structure.

From the foregoing, it will be understood and appreciated how the gimbal ring 20 is delicately and accurately positioned to some desired angle of rotation about an axis determined by the pins 21 and 22. Thereafter, and referring to FIG. 2, it will be understood how the second axis of rotation, which is perpendicular to the first axis, is utilized. The second axis likewise permits fine adjustment of its position through the use of the driving means 37 illustrated in FIG. 2. That is to say, the driving means 37 rotates the pin 31 which carries with it the second gimbal ring 33.

From the foregoing, it is believed that the manner of operation and construction of the apparatus is made readily apparent. The apparatus has been described in use very generally inasmuch as the scientific device may vary widely. It may be a sextant, camera, camera sensitive to infared or long exposures, and so on. Without regard to the precise nature, the apparatus provides an axial opening of sufficient angular opening to permit the scientific device 11 to be pointed through the port 14 for observations which are external of the craft itself. The craft provides a stable mount for receiving the flexible mount of the present invention. As shown in FIGS. 1 and 2, the flexible mount is received adjacent to the port 14, and a hermetic seal is achieved through the use of a shroud 41 and the flexible welded bellows 40. The bellows extend from the rear of the port or opening where they interconnect with the shroud 41 which defines the opening in the craft and extend backwardly to a mounting plate 34. The mounting plate 34 is manipulated in position by the operation of the quadrature axes to precisely define positions. This carries the scientific apparatus 11 to the desired location.

The angle of deflection can vary, and is considerably dependent on detailed bellows and gimbal design, but for this design, is something on the order and range of about 50° as marked in FIG. 2. Inasmuch as the gimbals are essentially symmetrical, and the bellows 40 inscribe a circular port 14 and what is normally a large port 34a of substantial size, a cone of deflection of perhaps 25° is achieved, with the 25° angle being measured from the central axis through the equipment as best shown in FIG. 2. In any case, the apparatus deflects over a wide range. It will be appreciated and understood that the atmosphere within the craft is protected against leaks on deflection of the equipment. The apparatus is able to be pointed with great precision and reliability, and repeatability on later use. Moreover, the scientific experiment can be performed without precise maneuvering and positioning of the craft. The virtues of the apparatus are believed readily apparent from a consideration of the preferred embodiment which has been described hereinabove.

Figure 5:
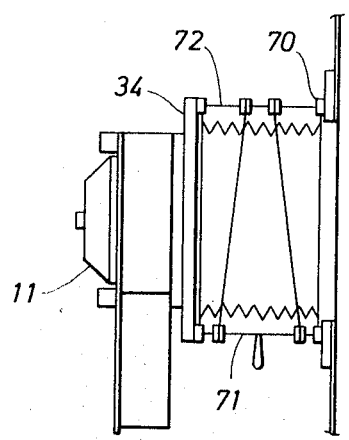
FIG. 5 is a schematic view showing an alternative construction to that of the preferred embodiment of FIG. 1; and, FIG. 6 is a schematic view showing a second alternative construction of the present invention.

Attention is next directed to FIG. 5 of the drawings which shows an alternative embodiment in schematic form. In FIG. 5, the numeral 70 indicates a fixed member which has an interacting peripheral surface with a cam 71. Another fixed member 72 is connected to the mounting plate 34 which is again found in FIG. 5. Also, an additional scientific device 11 is indicated. The apparatus of FIG. 5 is shown in its neutral position. However, should deflection at some angle be desired, the cam 71 is rotated to reposition the device. This causes the bellows to flex, and permits positioning of the scientific device at some other angle. Preferably, the members 70, 71 and 72 have interlocking edges which might be likened to a tongue and groove interconnection which permit smooth rotation of the cam 71. As shown in FIG. 5, one edge or end of the cam 71 is of greater thickness than the other end. As the cam 71 is rotated, the greater thickness causes deflection noted and the scientific device thereby is pointed in another direction. For convenience, a handle is provided on the cam 71 to reposition it.

Figure 6:
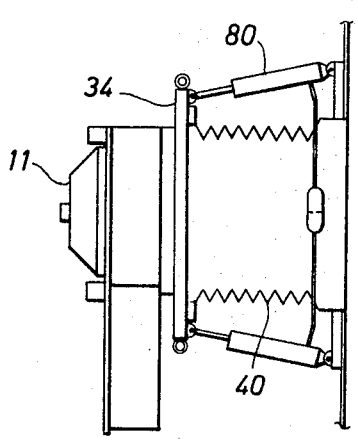

Attention is next directed to FIG. 6 which shows a further alternative embodiment. The scientific device 11 is carried on a mounting plate 34. The plate 34 again joins the bellows 40 in the previous manner. The bellows 40 again interconnects with the side of the craft and surrounds the port 14 in the manner described above. The plate 34 is held in position parallel to the port by four double acting hydraulic cylinders which are all similar to the one indicated by the numeral 80. Various angles and positions for the scientific device 11 are achieved by extending or retracting the various hydraulic cylinder arrangements located about the mounting plate 34. Four are preferably used to achieve an orthogonal relationship to thereby make various skewed angles more easily defined. Precision positioning can be utilized on calibrating the hydraulic equipment. In any case, the embodiment of FIG. 6 utilizes the controlled extension and retraction of the hydraulic piston and cylinder arrangement to position the mounting plate 34 and hence the scientific device 11 at any desired angle.

The foregoing has been directed to the preferred embodiment and two alternative embodiments of a flexible mount permitting operation of a scientific device from within a craft.

What is claimed is:

1. A mounting apparatus which permits a field of view through a port of an aircraft, spacecraft, or the like, comprising:
   a. flexible and extendable bellows having a central opening permitting viewing therealong;
   b. mounting means for securing one end of said bellows adjacent a port of a craft in a manner such that viewing through said bellows and the port is possible;
   c. additional mounting means having an opening therethrough and carried near the other end of said bellows for supporting in an operative relationship a scientific device which is enabled to view through the opening of said additional mounting means said bellows and the port of the craft;
   d. means for fixedly and releasably positioning the scientific device with respect to the port over a range of angular positions of predetermined extent; and,
   e. means for hermetically sealing said one end of said bellows to said craft adjacent said port and the other end of said bellows to said additional mounting means to prevent leakage from the interior of the craft to the environment exterior of the craft.

2. The invention of claim 1 wherein said fixedly and releasably positioning means includes a first gimbal having an axis of rotation, said gimbal being connected to the craft and to said additional mounting means for controllably pivoting said additional mounting means and the scientific device about the axis of rotation.

3. The invention of claim 2 wherein said fixedly and releasably positioning means includes a second gimbal connected between said first gimbal and said additional mounting means and having an axis of rotation at right angles to the axis of rotation of said first gimbal, said second gimbal permitting movement of said additional mounting means and the scientific device about the first and second axes of rotation.

4. The invention of claim 2 wherein said first gimbal includes:
   a. a pair of oppositely disposed fixed pivotal members adapted to be secured with respect to the craft;
   b. an encircling support member extending about said bellow means on at least two sides and supported by said pivotal members for rotational movement; and,
   c. lock means for securing said support member at a fixed position with respect to a common axis through said pivotal members.

5. The invention of claim 2 wherein said first gimbal includes:

a. a fixed pivotal mounting member adapted to be joined to the craft;

b. a support member joined to said pivotal mounting member; and, c. rotatable control means connected to said pivotal mounting member for rotating said support member at a controlled rate in both directions about the axis of rotation.

6. The invention of claim 5 wherein said rotatable control means is a hand operated device having at least two rates of operation.

7. The invention of claim 5 wherein said rotatable control means is operatively connected to a pivot pin means coincident with the axis of said pivotal mounting member for effecting rotary motion of the pivotal mounting member.

8. The invention of claim 1 wherein said means for fixedly and releasably positioning the scientific device includes a. a first gimbal having an axis of rotation, said gimbal being connected to the craft;

b. a second gimbal having a second axis of rotation perpendicular to the axis of rotation of said first gimbal and being connected to said first gimbal; and, c. means for connecting said additional mounting means to said second gimbal to thereby permit it to compound movement of said additional mounting means with said first and second gimbals.

9. The invention of claim 8 including means for controllably rotating said first gimbal about the first axis of rotation to position same at a predetermined angle, said means including a coarse adjustment and a fine adjustment.

10. The invention of claim 8 including means for controllably rotating said second gimbal about the second axis of rotation to position same at a predetermined angle, said means including a coarse adjustment and a fine adjustment.

* * * * *